United States Patent
Hamminga et al.

(10) Patent No.: US 12,078,752 B2
(45) Date of Patent: Sep. 3, 2024

(54) DETECTION AND CLASSIFICATION OF UNMANNED AERIAL VEHICLES

(71) Applicant: ROBIN RADAR FACILITIES BV, The Hague (NL)

(72) Inventors: Siete Hamminga, Heemstede (NL); Bart Portegijs, Leiden (NL); Hylke Jurjen Lijsbert Westra, Leiden (NL)

(73) Assignee: ROBIN RADAR FACILITIES BV, The Hague (NL)

( * ) Notice: Subject to any disclaimer, the term of this patent is extended or adjusted under 35 U.S.C. 154(b) by 410 days.

(21) Appl. No.: 17/438,649

(22) PCT Filed: Mar. 13, 2020

(86) PCT No.: PCT/EP2020/056921
§ 371 (c)(1),
(2) Date: Sep. 13, 2021

(87) PCT Pub. No.: WO2020/200704
PCT Pub. Date: Oct. 8, 2020

(65) Prior Publication Data
US 2022/0189326 A1  Jun. 16, 2022

(30) Foreign Application Priority Data
Mar. 29, 2019  (EP) .................................... 19166246

(51) Int. Cl.
*G06V 10/82* (2022.01)
*B64C 39/02* (2023.01)
(Continued)

(52) U.S. Cl.
CPC ............ *G01S 7/417* (2013.01); *B64C 39/024* (2013.01); *G06V 10/764* (2022.01); *G06V 10/82* (2022.01);
(Continued)

(58) Field of Classification Search
CPC ...... G06V 20/54; G06V 10/82; G06V 10/764; G06V 20/17; G01S 7/417; G01S 7/412;
(Continued)

(56) References Cited

U.S. PATENT DOCUMENTS

| | | | |
|---|---|---|---|
| 7,876,258 B2* | 1/2011 | Abraham | G08G 5/045 342/159 |
| 9,881,508 B2* | 1/2018 | Silver | G08G 5/0078 |
| 9,978,013 B2* | 5/2018 | Kaufhold | G06N 3/045 |
| 10,302,759 B1* | 5/2019 | Arteaga | G08G 5/0082 |

(Continued)

FOREIGN PATENT DOCUMENTS

| | | |
|---|---|---|
| CN | 107886121 A | 4/2018 |
| KR | 101314159 B1 | 10/2013 |

OTHER PUBLICATIONS

Shakhatreh et al., Unmanned Aerial Vehicles (UAVs): A Survey on Civil Applications and Key Research Challenges, 2019, IEEE, p. 48572-48634 (Year: 2019).*

(Continued)

*Primary Examiner* — McDieunel Marc
(74) *Attorney, Agent, or Firm* — Nordic Patent Service

(57) ABSTRACT

A method and system for real-time and automated detection and classification of aerial objects, such as e.g. UAVs, on a radar plot level from digital radar images, wherein the digital radar images are created from radar return signals obtained by a conventional radar such as e.g. a continuous wave radar (e.g. FMCW radar), a phased-array radar, or a pulse radar, as opposed to using specialized micro-Doppler radars for classifying UAVs based on the Doppler effect created by the rotors or propellers of the UAVs. Further, the method and system allow for tracking the UAVs based on the digital radar images.

17 Claims, 4 Drawing Sheets

(51) Int. Cl.
  *G01S 7/41* (2006.01)
  *G06V 10/764* (2022.01)
  *G06V 20/17* (2022.01)
  *G06V 20/54* (2022.01)
  *G08G 5/04* (2006.01)
  *B64U 101/30* (2023.01)

(52) U.S. Cl.
  CPC .............. *G06V 20/17* (2022.01); *G06V 20/54* (2022.01); *G08G 5/045* (2013.01); *B64U 2101/30* (2023.01)

(58) Field of Classification Search
  CPC ......... G01S 7/415; G01S 13/72; G08G 5/045; B64C 39/024; B64U 2101/30; B64U 10/13
  See application file for complete search history.

(56) References Cited

U.S. PATENT DOCUMENTS

| | | | | |
|---|---|---|---|---|
| 11,789,467 | B2* | 10/2023 | Zhong | G05D 1/0094 701/4 |
| 2014/0309915 | A1* | 10/2014 | Beda | G08G 5/0021 701/120 |
| 2015/0347871 | A1 | 12/2015 | Sathyendra et al. | |
| 2021/0048521 | A1* | 2/2021 | Leduc | G01S 13/75 |

OTHER PUBLICATIONS

Siewert et al., Drone Net architecture for UAS traffic management multi-modal sensor networking experiments, 2018, IEEE, p. (Year: 2018).*
Cho et al., An image processing algorithm for detection and tracking of aerial vehicles, 2012, IEEE, p. 7482-7484 (Year: 2012).*
Wegner et al., Cataloging Public Objects Using Aerial and Street-Level Images—Urban Trees, 2016, IEEE, p. 6014-6023 (Year: 2016).*
Mohajerin et al, "Feature extraction and radar track classification for detecting UAVs in civilian airspace", 2014 IEEE Radar Conference, IEEE, XP032628051, DOI: 10.1109/RADAR.2014.6875676, May 19, 2014, 6 pages.
Neumann et al, "Plot based target classification for ATC radars", 2015 16th International Radar Symposium (IRS), German Institute of Navigation, pp. 254-259, XP033211888, DOI: 10.1109/IRS.2015.7226248, Jun. 24, 2015, 6 pages.
Zhu et al, "Maritime Radar Target Detection Using Neural Networks", 1995 IEEE Wescanex Communications, Power, and Computing Conference Proceedings, vol. Conf. 5, pp. 196-201, XP000773444, DOI: 10.1109/WESCAN.1995.493970, ISBN: 978-0-7803-2726-9, May 15, 1995, 6 pages.
International Search Report, Application No. PCT/EP2020/056921, Mailed May 4, 2020, 3 pages.

* cited by examiner

DETECTION AND CLASSIFICATION OF UNMANNED AERIAL VEHICLES

TECHNICAL FIELD

The present disclosure relates generally to the detection and classification of unmanned aerial vehicles based on digital radar images.

BACKGROUND

Unmanned aerial vehicles (UAVs), often referred to as "drones", especially when referring to small multi-rotor or single-rotor UAVs, are generally aerial vehicles operated without a human operator aboard and piloted remotely in real-time or configured to operate autonomously.

The popularity and use of UAVs has increased significantly in recent years. However, UAVs may pose a threat to the airspace of airports or other areas that require a safe and regulated airspace around their perimeters, such as e.g. wind turbines, prisons, sporting venues, large crowds, residential homes, etc. Particularly, the growth in the use of UAVs has led to a rise in near-miss reports, closure of international airports due to UAV activity, and increased the risk of UAVs colliding with air traffic, as UAVs may easily come into the same airspace as an aircraft approaching or taking off at an airport. Disruption or collision may be caused intentionally or unintentionally, e.g. by a UAV operator who is ignorant of the UAV safety regulations around airports. Despite the often relatively small size and low weight of UAVs, particularly of consumer or commercial UAVs, collision of a UAV with an aircraft may cause severe damage to the structure of an aircraft and may, in the worst case, cause the aircraft to crash.

US2015347871A1 discloses a system and method for performing Automatic Target Recognition for maritime targets by combining the outputs of several classifiers. In one embodiment, feature vectors are extracted from radar images and fed to three classifiers. Hereto, a target region block isolates the rough silhouette of the maritime target which acts as a sub mask in conjunction with the input radar image form the inputs to a length estimation and Hough processing block. The target length is estimated, and the target range region is further refined and acts as input to the Hough processing algorithms. The Hough peaks and how lines for the targets are extracted as well as a refined target length estimate, which acts as input to the feature vector generation block. The feature vector generation block constructs feature vector for the digital radar image concerned. The feature vector comprises the measured characteristics of the maritime target. The feature vector is processed by a neural network in order to determine a maritime target class.

Therefore, there is a need for technologies for detecting and classifying these flying objects. Further, there is a need for technologies that can differentiate UAVs, in particular small multi-rotor, single-rotor, or fixed-wing propeller-driven UAVs from e.g. birds or bats, thus avoiding false UAV alarm caused by e.g. birds or bats and avoiding missed UAVs. It is known in the art to use micro-Doppler radars for UAV detection and classification for UAVs that have rotors or propellers causing the micro-Doppler effect. Particularly, it is known to distinguish between UAVs and birds based on their characteristic radar micro-Doppler signatures.

SUMMARY

It is an object to overcome or at least reduce the problems mentioned above.

The foregoing and other objects are achieved by the features of the independent claims. Further implementation forms are apparent from the dependent claims, the description, and the figures.

According to a first aspect, there is provided a computer-implemented method for classifying an aerial object represented on a digital radar image, the aerial object being an aerial object that may pose a collision risk for air traffic, the method comprising: receiving at least one digital radar image originating from a radar system, the at least one digital radar image having a total area formed by individual pixels, the at least one digital radar image comprising a radar plot of the aerial object, selecting a sub-area of the total area, the sub-area comprising the radar plot of the aerial object, and subjecting the sub-area to a (trained) deep learning model for determining whether the radar plot represents an aerial object belonging to one class of aerial objects.

Unexpectedly, through the insight of the inventors, it has been discovered that UAVs can be detected and classified on a radar plot level from digital radar images by subjecting a cutout of such a digital radar image to a deep learning model implemented in an electronic processing unit. This allows for using conventional radars such as e.g. a continuous wave radar, a phased-array radar, or a pulse radar for UAV detection and classification, as opposed to having to use specialized micro-Doppler radars.

In a possible implementation form of the first aspect, the method comprises receiving a chronological series of the digital radar images, concluding that the aerial object belongs to the one class when it is determined for a plurality of the digital radar images that the radar plot in the sub-areas of the plurality of the digital radar images subjected to the deep learning model belongs to the one class.

By receiving a chronological series of the digital radar images, the aerial object can be studied over time. Further, by concluding based on a plurality of digital radar images that the aerial object belongs to one class, the probability of correct detection and classification of the aerial object increases. Thus, uncertainties in detection and classification are reduced. The plurality of digital radar images may comprise e.g. at least two or three digital radar images. However, it is noted that the plurality of digital radar images may comprise a significantly larger number of digital radar images such as hundreds or thousands of digital radar images. Thus, if it is determined for e.g. at least two or three digital radar images in the chronological series of the digital radar images that the radar plot represents a UAV, then it is concluded that the aerial object is a UAV.

In a possible implementation form of the first aspect, the method comprises receiving a chronological series of the digital radar images, wherein each of the digital radar images comprises a radar plot of the aerial object, combining the radar plots of the aerial object into a sequence of radar plots of the aerial object, obtaining from the sequence of radar plots of the aerial object a track for the aerial object, concluding that the track represents an aerial object belonging to the one class when it is determined for a plurality of the radar plots in the sequence that the radar plot subjected to the deep learning model belongs to the one class.

Thus, consecutive radar plots representing the same aerial object or target may be associated with tracks. This may be useful, for example, when the radar system is reporting observations of different targets or when it is necessary to combine the observations from different radars or other sensors. The tracks obtained in this way may comprise information about e.g. position (in two or three dimensions), course, speed, and/or closest point of approach (CPA) of the target. The tracks may be formed and updated in real-time, thus allowing for real-time tracking of aerial objects such as e.g. UAVs. Flight paths may be determined and predicted and may be visualized on a display, e.g. on a map-based interface. Further, such tracks may be used for e.g. generating an alert, avoiding UAV collision, investigating the flying behavior of a UAV, etc.

In a possible implementation form of the first aspect, the method comprises creating the at least one digital radar image from a signal received from a radar system. The digital radar image can be created from an analogous signal obtained by the radar system, wherein the radar system is e.g. a 3D radar. The radar image is digitized if the received signal is not already in digital form. The radar image is generally a two-dimensional representation of pixels, wherein the intensity or brightness of each pixel is proportional to the amount of backscatter. If a three-dimensional radar is used, a three-dimensional image is formed by a stack of two-dimensional images. The digital radar image may be displayed on monitors in the form of a matrix of pixels in rows and columns. Further, the digital radar image may be subjected to digital radar image processing, for example for enhancing and/or revealing features of one or more pixels.

In a possible implementation form of the first aspect, the at least one digital radar image is a raw digital radar image. This allows for using raw digital radar images directly, i.e. without the need for e.g. filtering of the raw digital radar image.

In a possible implementation form of the first aspect, the radar system comprises at least one of a phased-array radar, a pulse radar, and a FMCW radar. This renders the method compatible with conventional radar systems and allows the method to be integrated into the radar systems that typically exist at airports.

In a possible implementation form of the first aspect, the step of selecting a sub-area of the total area comprises applying a detection algorithm to the at least one digital radar image for detecting and locating in the at least one digital radar image a radar plot of the aerial object. The effect hereof is that the radar plot of the aerial object or target can be detected and located in the radar image. The detection algorithm may be a manually created algorithm that is operated automatically. The determined location of the radar plot may be used to determine the sub-area of the radar image to which the deep learning model should be subjected for classification. Particularly, the determined location of the radar plot may be used for selecting the sub-area, incl. e.g. size and shape of the sub-area.

In a possible implementation form of the first aspect, the step of applying the detection algorithm for detecting and locating the radar plot comprises filtering static clutter and dynamic clutter. Clutter, i.e. unwanted echoes, may be removed from the whole radar image or specifically from the sub-area of the radar image, thus obtaining a higher quality of the data associated with the sub-area, particularly a higher quality of the data associated with the radar plot of the aerial object. The higher data quality results in more certain data analyses, particularly more certain detection and classification of the aerial object.

Pre-processing may be optionally done to the digital radar image. For example, in a possible implementation form of the first aspect, the method comprises applying at least one of a distance correction, a static clutter filtration, and a long-term average correction to the at least one digital radar image, preferably only to the sub-area of the at least one digital radar image, prior to applying the deep learning model. The pre-processing may be applied to the whole radar image prior to selecting the sub-area, or the pre-processing may be applied to the selected sub-area. The pre-processing may result in increased quality of the radar image, particularly increased quality of the data associated with the radar plot of the aerial object, thus facilitating detection and classification and increasing the accuracy and reliability of the detection and classification.

In a possible implementation form of the first aspect, the sub-area comprises a lesser number of pixels compared to the total area, preferably a substantially lesser number of pixels compared to the total area, more preferably the sub-area has a size of 32 by 32 pixels, most preferably the sub-area has a size of 16 by 16 pixels. Thus, the method is compatible with sub-areas of different pixel sizes, depending on the circumstances.

UAVs come in various sizes and shapes. For example, consumer and commercial UAVs typically weigh under 10 kg, most often less than 2 kg. Further, most often, consumer and commercial UAVs are quadcopter-type UAVs. In a possible implementation form of the first aspect, the one class is a class of unmanned aerial vehicles (UAVs). The effect hereof is that UAVs can be detected and classified. For every detected radar plot, it is determined whether the radar plot represents a UAV or not.

The method may be used to distinguish between different classes of aerial objects. Thus, in a possible implementation form of the first aspect, the one class is one of a plurality of classes and the one class comprises at least a class of UAVs, a class of birds, a subclass of birds of prey, a class of bats, a class of insects.

In another possible implementation, the class of UAVs' comprises small multi-rotor, single-rotor UAVs and/or fixed-wing propeller driven UAVs.

The method may be used for detecting and classifying UAVs of various sizes. For example, small UAVs (SUAVs) and UAVs of sizes similar to the sizes of many birds, i.e. UAVs that could easily be confused with birds, may be detected and classified. In a possible implementation form of the first aspect, the UAVs have a physical dimension in the range of 0.05 to 2 meters. In a possible implementation form of the first aspect, the physical dimension refers to a largest physical dimension of the object.

Several image classification models are known. In a possible implementation form of the first aspect, the deep learning model is trained for classifying radar plots in sub-areas according to the one class. The deep learning model may be a trained convolutional neural network that has been obtained by retraining a pre-trained convolutional neural network to obtain a deep learning model for determining whether a radar plot represents an unmanned aerial vehicle. The retraining may be performed using the machine learning concept of transfer learning according to which knowledge derived from a learning problem is used to enhance learning on a different related problem. For example, knowledge gained while learning to recognize e.g. birds may be applied when learning to recognize UAVs. An effect of using transfer learning is that the learning process may be faster, more accurate, and/or may need less training data.

In a possible implementation form of the first aspect, the deep learning model is a trained deep residual learning framework for image classification tasks, preferably a residual neural network (ResNet). Particularly, the deep learning model may be e.g. a Resnet34-model.

In a possible implementation form of the first aspect, the deep learning model is a trained neural network model that has been obtained by training an untrained or a pre-trained neural network. The deep learning model may be trained using supervised machine learning wherein a correctly labelled/tagged data set is used, i.e. a data set comprising radar plots that have already been labelled/tagged as representing e.g. UAVs, thus allowing the deep learning algorithm to learn from the labelled training data.

In a possible implementation form of the first aspect, the deep learning model is a trained deep learning model, preferably a trained deep learning model that has been trained by assigning to each of a plurality of sub-areas a label correctly indicating whether the radar plot represents the aerial object in the one class of aerial objects, and subjecting the plurality of correctly labelled sub-areas to the deep learning model.

In a possible implementation form of the first aspect, the (trained) deep learning model is a trained convolutional neural network, preferably a trained convolutional neural network that has been obtained by training a pre-trained convolutional neural network by assigning to each of a plurality of sub-areas a label correctly indicating whether the radar plot represents the aerial object in the one class of aerial objects, and subjecting the plurality of correctly labelled sub-areas to the pre-trained convolutional neural network.

A training set for training the deep learning model for recognizing radar plots, also referred to as plots, of UAVs, particularly for training the deep learning model for determining whether a radar plot represents a UAV or not, may comprise radar plots (plots) of various objects, e.g. UAVs, birds, cars, bikes, pedestrians, cows, and/or other objects.

The sub-area may be in the form of e.g. a selected sub-area of the radar image, a cropped radar image, or a cutout. In a possible implementation form of the first aspect, the step of selecting in the at least one digital radar image a sub-area of the total area comprises cutting out the sub-area from the digital radar image and generating an image cutout comprising the sub-area.

According to a second aspect, there is provided a computer system for classifying an aerial object represented on a digital radar image, the aerial object being an aerial object that may pose a collision risk for air traffic, the computer system comprising a deep learning model and a processor configured to: receive at least one digital radar image originating from a radar system, the at least one digital radar image having a total area formed by individual pixels, the at least one digital radar image comprising a radar plot of the aerial object, select a sub-area of the total area, the sub-area comprising the radar plot of the aerial object, and subject the sub-area to the deep learning model on the computer system to thereby determine whether the radar plot represents an aerial object belonging to one class of aerial objects.

In a possible implementation form of the second aspect, the deep learning model is a trained deep learning model, preferably a deep learning model that has been trained by subjecting a plurality of correctly labeled sub-areas to the deep learning model.

According to a third aspect there is provided a use of the method according the first aspect or any implementations thereof or of the second aspect or any implementations thereof, to determine if an aerial object represented in a radar plot in a digital radar image is an unmanned aerial vehicle, in particular a small unmanned aerial vehicle, even more in particular a small unmanned aerial vehicle with one or more rotors.

These and other aspects will be apparent from the embodiment(s) described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

The method and system described herein allow for real-time and automated detection and classification of aerial objects, such as e.g. UAVs, based on digital radar images. The digital radar images are created from radar return signals obtained by a conventional radar such as e.g. a continuous wave radar (e.g. FMCW radar), a phased-array radar, or a pulse radar, as opposed to having to use specialized micro-Doppler radars for classifying UAVs based on the Doppler effect created by the rotors or propellers of the UAVs. Further, the method and system described herein allow for tracking UAVs using digital radar images.

Figure 1:
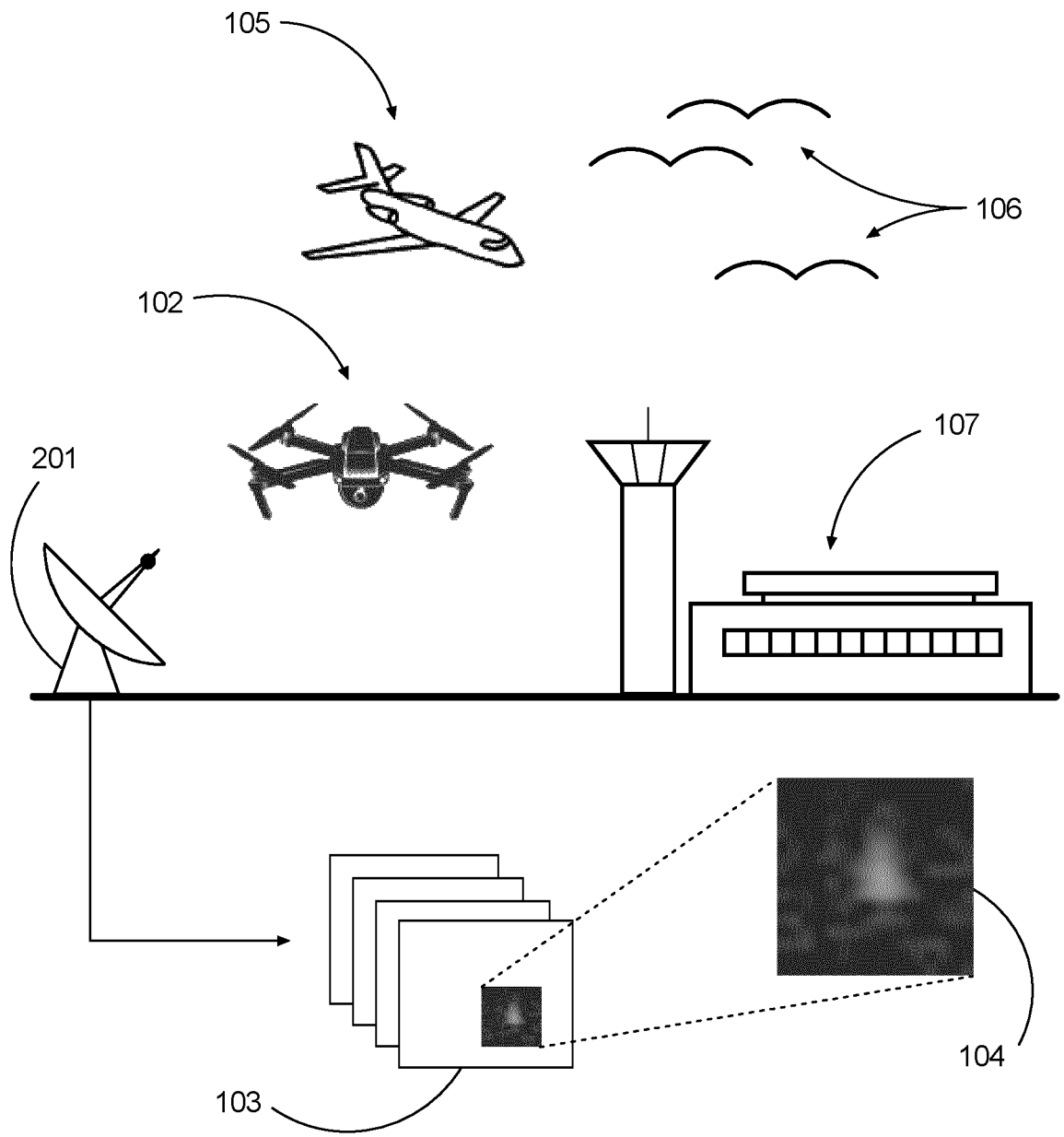
FIG. 1 is a diagrammatic illustration of a UAV, birds, and an approaching aircraft in the airspace of an airport, also illustrating the obtaining of digital radar images of aerial objects and detection of radar plots of aerial objects in digital radar images.

FIG. 1 is a diagrammatic representation showing a UAV 102, birds 106, and an approaching aircraft 105 in the airspace of an airport 107. FIG. 1 also illustrates a method and system for obtaining digital radar images 103 of aerial objects in the airspace, and detection of radar plots, also referred to as plots, of aerial objects in the digital radar images 103, in accordance with an embodiment. The UAV 102 may pose a risk for the aircraft 105 and for other air traffic. A radar system is provided 201, which radar system may comprise one or more radars covering a selected airspace for the detection of UAV activity in the selected airspace. The radar system 201 may comprise e.g. at least one of a continuous wave radar system, a phased-array radar system, and a pulse radar system. In an embodiment, the radar system 201 is a 3D phased-array radar system. The radar system 201 comprises one or more electronic processing units for processing the radar signal into a raw digital radar image and for further processing of the raw digital radar image, e.g. for subjecting the digital radar image to a detection algorithm. The one or more electronic processing units come in the form of one or more digital computers each comprising one or more processors.

The exemplary UAV 102 of FIG. 1 is a small quadcopter UAV having four rotors. However, the UAV may be any other kind of UAV. For example, the UAV may be a multi-rotor, a fixed-wing, a single-rotor (helicopter), or a fixed-wing hybrid UAV. The UAV can e.g. be a consumer and commercial UAV and may weigh under 10 kg and have physical dimensions in the range of 0.05 to 2 meters. While only one UAV 102 is shown in FIG. 1, multiple UAVs or even swarms of UAVs may be detected and classified.

Radar return signals obtained by the radar system 201 are sampled and digitized by an electronic processing unit to obtain digital radar images 103 of the aerial objects present in the airspace of the airport 107. The digitization of the radar return signals to obtain digital radar images 103 may be performed by a processing unit of the radar system or by an external processing unit.

The digital radar images 103 each have a total area formed by individual pixels. The digital radar images 103 are subjected to a detection algorithm for detection of radar plots, also referred to as plots, of aerial objects in the digital radar images 103, and a sub-area defined around and comprising a radar plot of an aerial object is subjected to a deep learning model for classification of the detected radar plots of the aerial objects.

Thus, the UAV 102 and birds 106 present in the airspace can be distinguished between on a radar plot level. In some embodiments, the digital radar images 103 may be pre-processed to remove clutter prior to applying the detection algorithm and may be pre-processed by applying a distance correction, a possibly second static clutter filtration, and/or a long-term average correction prior to applying the deep learning model to the sub-areas of the digital radar images.

The selected sub-area 104 comprises a radar plot of a UAV as detected in the digital radar image by the detection algorithm and thereafter classified by the deep learning model. Radar plots from the different digital radar images 103 representing the same UAV, e.g. UAV 102, may be associated into a track for that UAV. The track may comprise information about e.g. position (in two or three dimensions), course, speed, and/or closest point of approach (CPA) of the UAV. The track may be formed and updated in real-time, thus allowing for real-time tracking of the UAV. Flight paths may be determined and predicted and may be visualized on a display, e.g. on a map-based interface. Further, a track obtained in this way may be used for e.g. generating an alert, avoiding UAV collision, investigating the flying behavior of a UAV, etc. Thus, for example, the risk posed by the UAV 102 for the aircraft 105 or other air traffic can be evaluated, and the necessary means to remove the risk can be taken.

Figure 2:
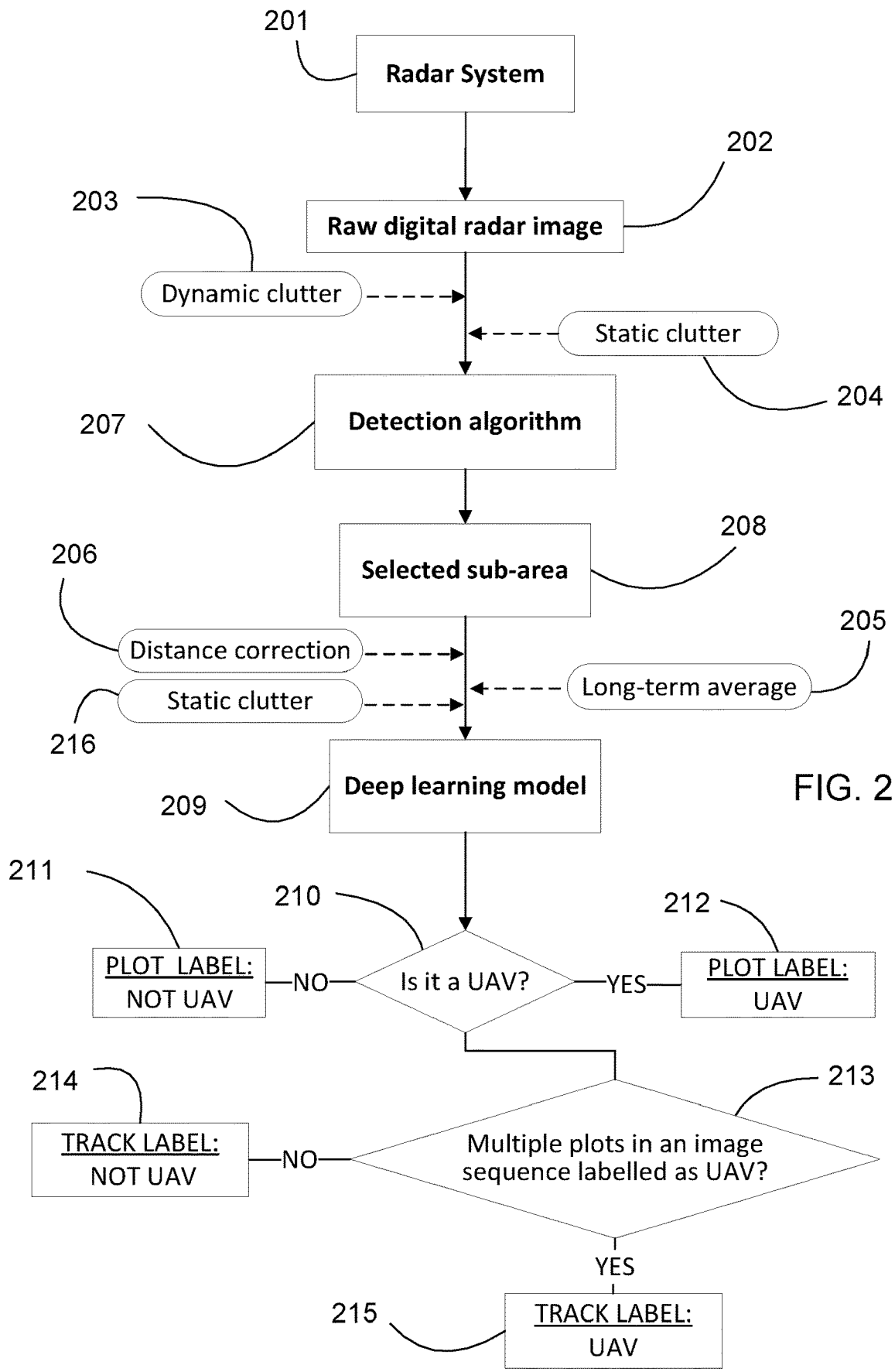
FIG. 2 is a flowchart of an embodiment of a method for detecting, classifying, and tracking UAVs on a radar plot level from digital radar images.

FIG. 2 is a flowchart illustrating a method for detecting, classifying, and tracking aerial objects on a radar plot level from digital radar images using the electronic processing unit associated with the radar system or using a remote electronic processing unit coupled to the radar system, in accordance with an embodiment. The method comprises obtaining a digital radar image 202 from a radar system 201.

The digital radar image 202 has a total area formed by individual pixels, and the digital radar image 202 comprises a radar plot, also referred to as a plot, when an aerial object is detected by the radar system 201.

A sub-area 208 of the total area of the digital radar image 202 is selected by the detection algorithm implemented in the electronic processing unit so that the sub-area 208 comprises the radar plot of the aerial object.

The subarea 208 is subjected to a deep learning model 209 implemented in the electronic processing unit for determining whether the radar plot represents a UAV 210. The sub-area 208 is selected using the detection algorithm 207 which is applied by the electronic processing unit to the digital radar image 202 for detecting a radar plot of an aerial object in the digital radar image. In an embodiment, the detection algorithm 207 is a manually created and automatically operated algorithm. In an embodiment, the raw digital radar image 202 obtained from the radar system 201 may be pre-processed by removing dynamic clutter 203 and/or static clutter 204 prior to applying the detection algorithm. Removing dynamic and static clutter and detecting aerial objects for creating plots are techniques that are well known in the art and that are, therefore, not described in further detail here.

Further, a distance correction 206, a long-term average correction 205, and/or a static clutter filtration 216 may be applied by the electronic processing unit to the selected sub-area, as shown in FIG. 2, or to the entire digital radar image prior to subjecting the selected sub-area 208 to the deep learning model 209. The distance correction 206, long-term average correction 205, and possibly second static clutter filtration 216 are applied in order to obtain a clean radar plot of the aerial object.

In case two static clutter filtering steps are applied, respectively 204 and 216, the same static clutter filter may be used in both steps.

Prior to operating the deep learning model 209 for classification, the deep learning model 209 is trained for classifying an aerial object by feeding a plurality of radar plots of objects or sub-areas 208 of digital radar images to the electronic processing unit and simultaneously informing the deep learning model of the class of aerial object, e.g. UAV or not UAV. The class of non-UAVs may comprise birds, bats, cars, bikes, pedestrians, cows, and/or other objects.

The electronic processing unit using the deep learning model 209 determines whether the radar plot represents an aerial object belonging to a particular class of aerial objects, e.g. whether the radar plot represents a UAV or not, more preferably whether the radar plot represents a UAV or a bird. Thus, the deep learning model 209 is able to distinguish between UAVs and other objects, e.g. between UAVs and birds, based on digital radar images 202. The deep learning model 209 is, in an embodiment, a convolutional neural network (CNN), e.g. a ResNet-34 network, wherein the CNN is retrained by training the CNN on digital radar images not related to the images used for its pre-training, i.e. using the concept of transfer learning. In an embodiment, the CNN is retrained by training the CNN on digital radar images of UAVs and e.g. birds, cars, bikes, pedestrians, cows, and/or other objects in order to obtain a CNN for classifying UAVs and for distinguishing UAVs from other objects, particularly from other aerial objects such as e.g. birds and bats. As an alternative to using a re-trained CNN based on the concept of transfer learning, a self-trained CNN is used in an embodiment.

The method comprises assigning to the sub-area comprising the radar plot of the aerial object a label indicating whether the radar plot represents a UAV or not (211, 212). The labelled sub-area (211, 212) may be used for further training of the deep learning model, thus obtaining an improved deep learning model. A dataset for use as a training set may be constructed from a plurality of labelled sub-areas.

If multiple digital radar images are obtained, e.g. in a chronological sequence, like e.g. a series of images, radar plots from different digital radar images representing the same aerial object may be associated into a track for the aerial object by the electronic processing unit. The method comprises concluding that the track represents a UAV and labeling the track as representing a UAV 215 if a plurality of the radar plots were classified as representing a UAV by the deep learning model 210. If this is not the case, the object is classified as being different from a UAV.

In an embodiment, the electronic processing unit and/or the radar system is coupled to a display screen.

Finally, not shown in the flowchart, in an embodiment, the electronic processing unit is configured to present the result of the classification, i.e. the determined class of the detected aerial object, on the display screen or to send a message containing the result of the classification. In an embodiment, the electronic processing unit is configured to display the obtained track representing a UAV on a display screen. In an embodiment, the electronic processing unit is configured to display the obtained track representing a UAV on a display screen as an overlay on the digital radar image displayed on a display screen or as an overlay on a map of the area covered by the radar system on a display screen.

Figure 3:
FIG. 3 is an example cutout from a raw digital radar image, which cutout comprises a radar plot of a UAV.
Figure 4:
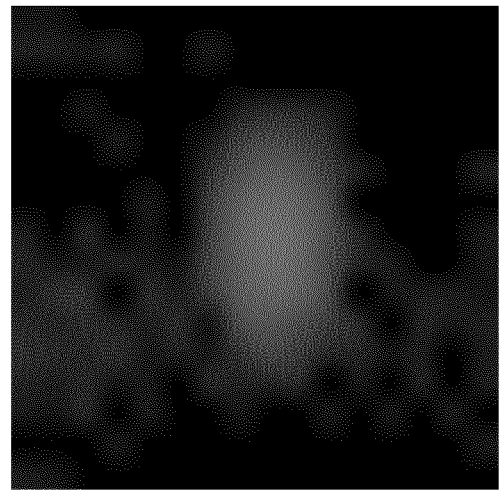
FIG. 4 is an example cutout from a raw digital radar image, which cutout comprises a radar plot of a bird.
Figure 5:
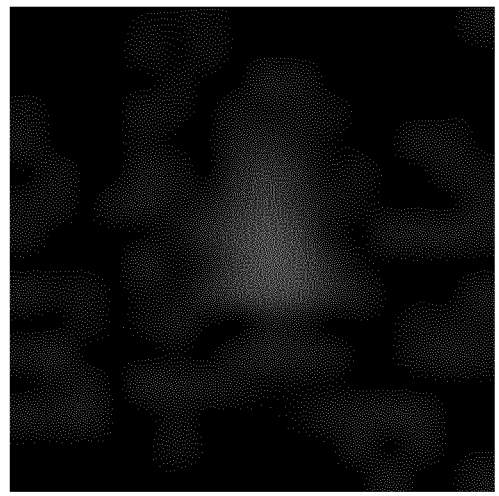
FIG. 5 is a 16×16 pixel digital radar image of a UAV.
Figure 6:
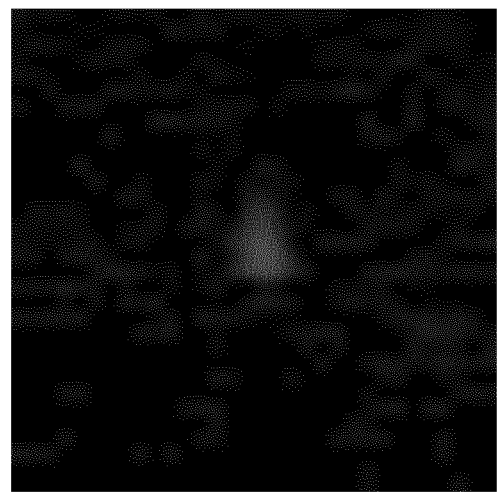
FIG. 6 is a 32×32 pixel digital radar image of a UAV.

FIGS. 3 and 4 illustrate different versions of sub-areas in the form of cutouts from raw digital radar images. FIGS. 5 and 6 illustrate further versions of sub-areas in the form of a 16×16 pixel digital radar image and a 32×32 pixel digital radar image, respectively.

Each of FIGS. 3, 4, 5, and 6 constitutes a sub-area selected from a total area of a digital radar image. The sub-areas of FIGS. 3, 5, and 6 comprise the radar plot of a UAV and its closest surroundings at a given time and position in an airspace. The sub-area of FIG. 4 comprises the radar plot of a bird and its closest surroundings at a given time and position in an airspace.

In some embodiments, a sub-area is automatically selected in a total area of a digital radar image by the electronic processing unit applying a detection algorithm to the digital radar image for detecting and locating in the digital radar image a radar plot, also referred to as a plot, of an aerial object. The detection algorithm may be a manually created but automated algorithm. The detection algorithm may be applied to select multiple sub-areas in the same digital radar image, if multiple radar plots of aerial objects are present in the same digital radar image.

Based on the determined location of the radar plot of the aerial object in the digital radar image, the sub-area is selected in such a way that the sub-area comprises the radar plot.

The sub-area comprises a lesser number of pixels compared to the total area of the digital radar image, preferably a substantially lesser number of pixels compared to the total area, more preferably the sub-area has a size of 32 by 32 pixels, most preferably the sub-area has a size of 16 by 16 pixels. A smaller sub-area with fewer pixels is preferred in order to reduce the required computing power for the electronic processing unit. However, below a certain number of pixels the quality of the classification results obtained with the deep learning model deteriorate. Through trial and error, it has been determined that a sub-area with as few as 16×16 pixels results in reliable and accurate conclusions from the deep learning model.

Depending on the circumstances, the selected sub-area may vary in size and shape. In some embodiments, the step of applying the detection algorithm for detecting and locating the radar plot comprises removing static clutter and dynamic clutter from the digital radar image. The clutter may be removed from the whole digital radar image, thus facilitating detection of the radar plot of the aerial object therein, or the clutter may be removed specifically from the sub-area, thus obtaining higher quality of the data associated with the sub-area, particularly higher quality of the data associated with the radar plot of the aerial object.

FIGS. 3, 4, 5, and 6 are examples of sub-areas that can be provided as input to a deep learning model for classification of the aerial object represented therein. Thus, it can be determined which class of aerial objects the radar plot belongs to, particularly whether the radar plot represents a UAV or not.

Further, FIGS. 3, 4, 5, and 6 are examples of images that can be used for training a deep learning model for obtaining a deep learning model trained to classify aerial objects, particularly UAVs, detected by e.g. a continuous wave radar, a phased-array radar, or a pulse radar and represented in a digital radar image.

In some embodiments, prior to applying the deep learning model, the digital radar image may optionally be pre-processed by the electronic processing unit by performing a distance correction, a long-term average correction, and/or a static clutter filtration to the digital radar image. The pre-processing may be applied to the whole radar image prior to selecting the sub-area, or the pre-processing may be applied to the selected sub-area. The pre-processing may result in increased quality of the radar image, particularly increased quality of the data associated with the radar plot of the aerial object, thus increasing the accuracy of the classification.

Figure 7:
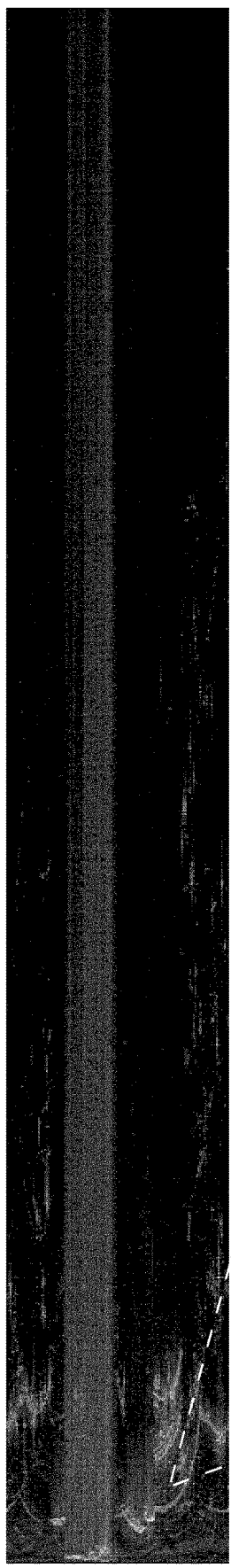
FIG. 7 is an example of a raw digital radar image obtained with one beam of a 3D radar having a total of 16 beams.
Figure 8:
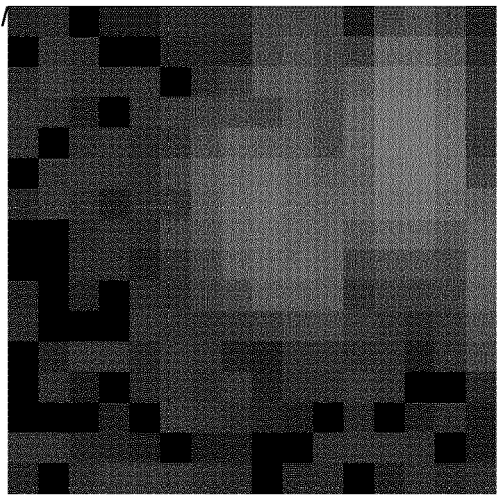
FIG. 8 is a cutout from the raw digital radar image of FIG. 7, which cutout comprises a radar plot of an aerial object that is not a UAV.

FIG. 7 is an example of a raw digital radar image as obtained with one beam of a 3D radar having a total of 16 beams. FIG. 8 is an example cutout from the raw digital radar image of FIG. 7, which cutout comprises a radar plot of an aerial object that is not a UAV. The cutout of FIG. 8 is a sub-area of the total area of the raw digital radar image of FIG. 7 as selected by applying a detection algorithm implemented in an electronic processing unit to the digital radar image of FIG. 7 for detecting and locating in the digital radar image a radar plot, also referred to as a plot, of an aerial object. The radar plot has been determined as not representing a UAV by a computer-implemented deep learning model trained for determining whether a radar representation (radar plot) represents a UAV or not.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:

1. A computer-implemented method for classifying an aerial object represented on a digital radar image, said aerial object being an aerial object that may pose a collision risk for air traffic, said method comprising:
receiving a chronological series of digital radar images originating from a radar system, said digital radar images each having a total area formed by individual pixels, each of said digital radar images comprising a radar plot of said aerial object, combining radar plots of said aerial object into a sequence of radar plots of said aerial object, obtaining from said sequence of radar plots of said aerial object a track for said aerial object, for each of said digital radar images selecting a sub-area of said total area, said sub-area comprising said radar plot of said aerial object, subjecting said sub-area to a deep learning model for determining whether said radar plot represents an aerial object belonging to one class of aerial objects, and concluding that said track represents an aerial object belonging to said one class when it is determined for a plurality of said radar plots in said sequence that the radar plot subjected to said deep learning model belongs to said one class.

2. The method according claim 1, comprising creating said digital radar image from a signal received from a radar system.

3. The method according to claim 1, wherein said radar system comprises at least one of a phased-array radar, a pulse radar, and a FMCW radar.

4. The method according to claim 1, wherein said step of selecting a sub-area of said total area comprises applying a detection algorithm to said digital radar image for detecting and locating in said digital radar images a radar plot of said aerial object.

5. The method according to claim 4, wherein said step of applying said detection algorithm for detecting and locating said radar plot comprises filtering static clutter and dynamic clutter.

6. The method according to claim 1, comprising applying at least one of a distance correction, a static clutter filtration, and a long-term average correction to said digital radar images, prior to applying said deep learning model.

7. The method according to claim 1, wherein said sub-area comprises a lesser number of pixels compared to said total area.

8. The method according claim 1, wherein said sub-area has a rectangular outline.

9. The method according to claim 1, wherein said one class is a class of unmanned aerial vehicles (UAVs).

10. The method according to claim 1, wherein said deep learning model is trained for classifying radar plots in sub-areas according to said one class.

11. The method according to claim 1, wherein said deep learning model is a trained deep learning model.

12. The method according to claim 1, wherein said deep learning model is a trained convolutional neural network.

13. The method according to claim 1, wherein said step of selecting for each of said digital radar images a sub-area of said total area comprises cutting out said sub-area from said digital radar image and generating an image cutout comprising said sub-area.

14. Use of the method according to claim 1 to determine if an aerial object represented in a radar plot in a digital radar image is an unmanned aerial vehicle.

15. A computer system for classifying an aerial object represented on a digital radar image, said aerial object being an aerial object that may pose a collision risk for air traffic, said computer system comprising a deep learning model and a processor configured to:

receive a chronological series of digital radar images originating from a radar system, said chronological series of digital radar images each having a total area formed by individual pixels, each of said digital radar images comprising a radar plot of said aerial object, combine radar plots of said aerial object into a sequence of radar plots of said aerial object, obtain from said sequence of radar plots of said aerial object a track for said aerial object, for each of said digital radar images select a sub-area of said total area, said sub-area comprising said radar plot of said aerial object, subject said sub-area to said deep learning model on said computer system to thereby determine whether said radar plot represents an aerial object belonging to one class of aerial objects, and conclude that said track represents an aerial object belonging to said one class when it is determined for a plurality of said radar plots in said sequence that the radar plot subjected to said deep learning model belongs to said one class.

16. The computer system according to claim 15, wherein said deep learning model is a trained deep learning model.

17. Use of the computer system according to claim 15 to determine if an aerial object represented in a radar plot in a digital radar image is an unmanned aerial vehicle.

* * * * *